United States Patent

[11] 3,572,008

[72] Inventors Paul M. Hankison
 Peters Township, Washington County;
 William Foster Walker, Bethel Park, Pa.
[21] Appl. No. 770,626
[22] Filed Oct. 25, 1968
[45] Patented Mar. 23, 1971
[73] Assignee Hankison Corporation
 Canonsburg, Pa.
 Continuation-in-part of application Ser. No. 637,860, Feb. 10, 1967, now Patent No. 3,464,186, which is a continuation-in-part of application Ser. No. 547,115, Mar. 22, 1966, now abandoned, which is a continuation-in-part of application Ser. No. 445,639, Apr. 5, 1965, now abandoned.

[54] METHODS AND MEANS FOR CLEANING AND DRYING COMPRESSED FLUID SYSTEMS
14 Claims, 6 Drawing Figs.
[52] U.S. Cl.................................................. 55/33,
 55/62, 55/186, 55/191, 210/23
[51] Int. Cl....................................................... B01d 53/04

[50] Field of Search............................................. 55/32, 33,
 58, 62, 96—98, 160, 161, 163, 185, 270, 302, 303,
 316, 387—389; 210/(D, C.D.)

[56] References Cited
UNITED STATES PATENTS

| | | | | |
|---|---|---|---|---|
| 1,493,110 | 5/1924 | Diehl............................ | 55/96 |
| 3,066,462 | 12/1962 | Yap et al. ..................... | 55/97 |
| 3,147,095 | 9/1964 | Kanuch ........................ | 55/62X |
| 3,152,877 | 10/1964 | Kaufman ...................... | 55/388X |
| 3,339,350 | 9/1967 | Sims............................. | 55/457X |
| 3,347,026 | 10/1967 | Zankey......................... | 55/387X |

Primary Examiner—John Adee
Attorney—Don J. Smith

ABSTRACT: We disclose methods and means for separating gaseous materials including vaporized moisture and for regenerating the gas separator or absorbent used for this purpose. We also disclose methods and means for separating a contaminant liquid from the aforementioned or other fluid systems and for regenerating the liquid separator thus employed.

PATENTED MAR 23 1971

INVENTORS
Paul M. Hankison and
William Foster Walker.
BY
Buell, Blenko & Ziesenheim
THEIR ATTORNEYS PATENTED MAR 23 1971
3,572,008
SHEET 2 OF 2
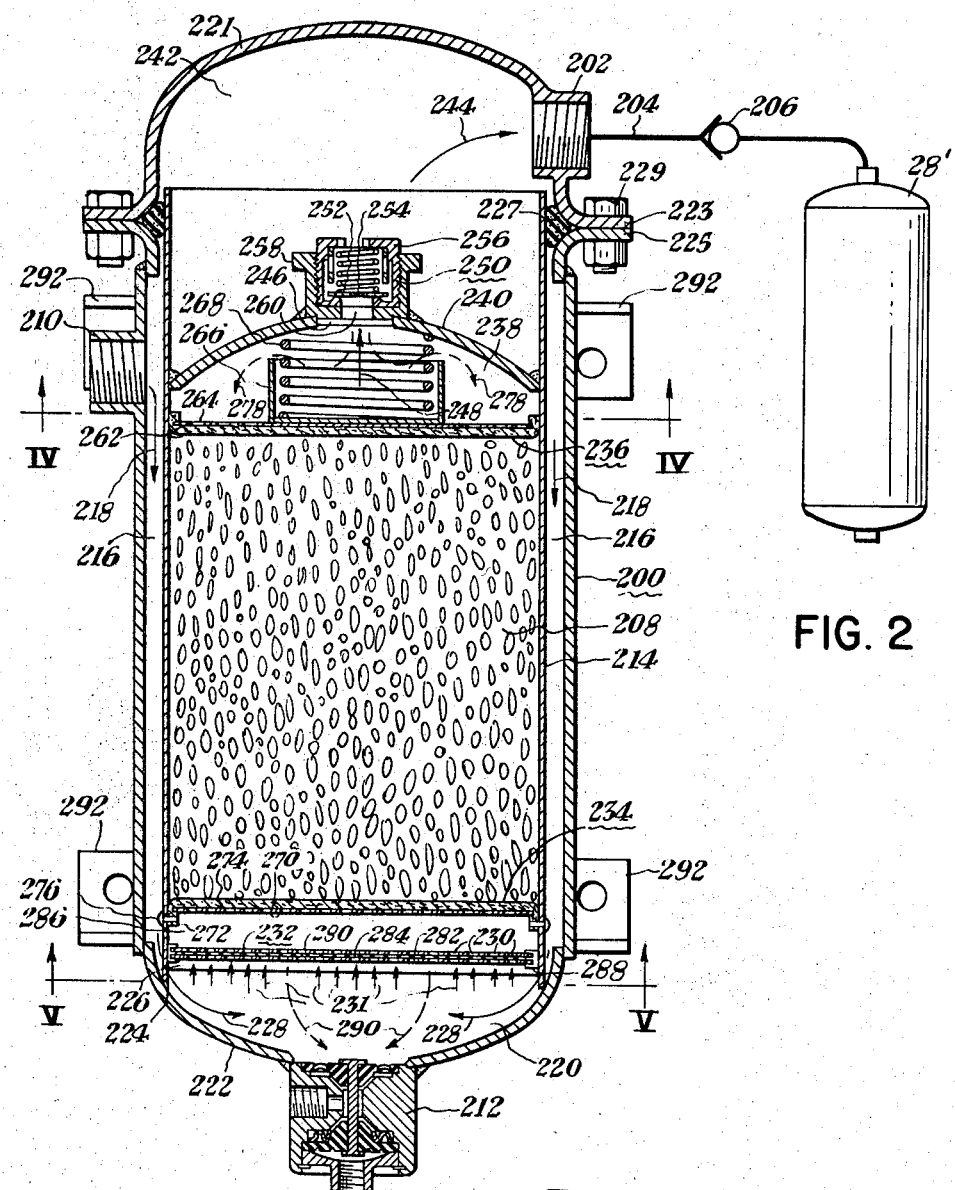
FIG. 2
FIG. 6
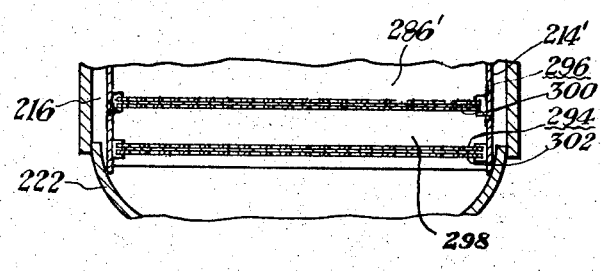
INVENTORS
Paul M. Hankison and
William Foster Walker.
BY
Buell Blenko & Ziesenheim
THEIR ATTORNEYS

METHODS AND MEANS FOR CLEANING AND DRYING COMPRESSED FLUID SYSTEMS

The present invention is a continuation-in-part of our copending, coassigned application, entitled "Dryer for Compressed Fluid Systems," filed Feb. 10, 1967, Ser. No. 637,860 now U.S. Pat. No. 3,464,186, which is a continuation-in-part of our copending, coassigned application entitled "Dryer for Compressed Fluid Systems," filed Mar. 22, 1966, Ser. No. 547,115 (now abandoned) which is a continuation-in-part of our copending, coassigned application entitled "Air Dryer for Compressed Air Systems," filed Apr. 5, 1965, Ser. No. 445,639 (now abandoned).

The present invention relates to methods and means for separating fluids in compressed fluid systems and more particularly to the separation of gases including vaporized moisture and/or liquid contaminants from such systems. The invention is particularly advantageous when employed in compressed fluid systems which are subjected to gas, water vapor and/or liquid such as oil contamination. Both the gaseous and liquid separating means of our invention are regenerable.

There are many applications wherein an absorbent or other gaseous or vapor-separating means are employed in compressed fluid systems. To prevent failure of the system and to obviate periodic replacement of the absorbent or separating means, it is highly desirable to provide a regenerating arrangement for the absorbent or separating means. For most applications, regeneration of the separator or absorbent must be automatic to prevent failure of the fluid system through human error in forgetting to replace or to regenerate the absorbent.

In many fluid systems, a contaminating liquid is unavoidably introduced which interferes drastically with the proper desorption of the absorbent or with other regenerating procedure. The contaminant liquid may be injected in the form of microscopic mists or aerosols or larger droplets. Frequently, the contaminant liquid is lubricating oil or the like unavoidably introduced into the compressed fluid system from a compressor or similar source of fluid.

In many types of gas or moisture separators the contaminating liquid becomes coated upon the separator absorbent so as to interfere with its gas or moisture sorptional properties. The presence of a liquid contaminant also prevents a proper or complete regeneration of the gas or moisture separator. Thus, the automatic feature inherent in many cyclically regenerable systems is lost, for the absorbent or separating means must be closely monitored to ensure replacement when the extent of liquid contamination becomes prohibitive.

In many applications to which our invention is well suited, the gas or moisture absorbent is a desiccant material such as silica gel, activated alumina, anhydrous calcium sulfate, molecular and various finely porous materials known as sieves. For the most part, these materials can be periodically regenerated by reverse flushing at reduced pressures without the application of heat. Examples of these processes are disclosed in the U.S. Pats. to Axt No. 3,182,435; Glass et al. No. 3,080,693; and Kennedy et al. No. 2,955,673. The disadvantages of these processes particularly with respect to vehicular brake systems are set forth in our aforementioned copending application, Ser. No. 637,860. Moreover, none of these patents teach the proper regeneration of a desiccant or other absorbent in the presence of a contaminating liquid or the use of regenerable means for separating such liquid.

There have been many attempts to prevent a contaminating liquid from reaching a desiccant or other absorbent or other critical structure which may be damaged by such liquid. Various liquid filters or absorbers have been proposed some of which are shown in the aforementioned patents. Other forms of filters for contaminant liquids are disclosed in the U.S. Pats. to Wilkerson No. 2,869,570; Dilworth No. 2,812,860; Kauer, Jr. et al. No. 3,279,151; White No. 2,962,119; and Taylor No. 3,197,946. In the White patent a sintered metal filter is used in an attempt to remove oil from a compressed air system. Oil apparently clings to both sides of the filter, which is supported vertically and flows downwardly into collecting chambers on either side of the filter. The filter is spring loaded against a valve seat, and when the filter becomes clogged the fluid pressure lifts the filter from the seat to bypass the filter. The White arrangement, therefore, is self-defeating.

The Wilkerson patent shows an air line trap with an automatic drain having an annular strainer screen in an air expansion chamber, from which collected moisture drips on to a partition, and thence into a pump chamber. The Wilkerson arrangement apparently is enabled only to remove entrained moisture droplets. In any event it would be ineffective in eliminating microscopic mists or aerosols.

The Taylor and Kauer, Jr. et al. patents merely disclose conventional in depth filters. The Taylor arrangement appears to be capable of coalescing only the larger droplets of moisture, while Kauer, Jr. et al. disclose a filter of pressed copper wool for preventing dust particles from entering and clogging an orifice plate downstream of the filter. None of the patents described thus far shows a liquid filter which is regenerable in any source of the term. Although the Kauer, Jr. et al. filter (for particulate material) is used in a cyclic system, there is no flow reversal through the conduit branch in which the filter is positioned.

The Dilworth patent discloses an annular filter for particulate matter and positioned upstream of an orifice plate to prevent clogging of the orifice. A compressed air chamber is provided adjacent the annular filter for periodically flushing, under control of manually operated valve, the particulate matter collected on the normally upstream side of the filter. The Dilworth filter likewise cannot remove microscopic mists or aerosols and therefore is not logically regenerable for liquid separation purposes. All of these liquid filters or separating means fail to prevent ultimate passage of contaminating liquids therethrough as they become saturated with the liquids. Use of such devices is self-defeating as the devices themselves must be periodically removed for cleaning and/or replacement. No adequate means have been proposed for periodically regenerating a regenerable liquid separator. In particular, no method or apparatus has been disclosed for periodically regenerating both a gas or moisture separator and a liquid contaminant separator used to prevent significant concentration of liquid contaminants within the gas or moisture separator.

As noted previously, our invention is amenable to a diversity of applications. For example, in many applications such as in gaseous diffusion separators, the separators are capable of operating indefinitely, if adequate means are utilized to prevent contact with a contaminant liquid. In addition to applications as set forth in our copending application Ser. No. 637,860, in gas diffusion systems and vehicular brakes, our invention is useful in a wide variety of applications such as paint spraying units, communication line purge systems, and in a large variety of commercial and laboratory applications involving the separation or absorption of either condensable or noncondensable gases. In these applications, the gas or moisture separator or absorbent is subject to contamination by various liquids unavoidably or inadvertently introduced into the system.

As set forth in our aforementioned application Ser. No. 637,860 our invention is particularly useful in air brake systems for vehicles, as these systems are subject to both moisture and oil contamination. The desirability of providing moisture free air for such systems to prevent clogging or corroding of the system and freezing during inclement weather has long been recognized and is elaborated upon in detail in our copending application Ser. No. 637,860. The advantages of a regenerable liquid separator for compressed air systems is likewise set forth in our last-mentioned application in considerable detail. In brief, oil or other contaminating liquid is unavoidably introduced into the compressed air or other fluid system by the compressor. Despite the presence of conventional filters, the oil or other contaminant liquid quickly permeates the desiccant or other absorbent and its sorption capacity is rapidly reduced below an acceptable level. Moreover, conventional desiccant or other absorbent regenerating procedures are inadequate to remove the liquid contaminant.

We overcome these defects of the prior art by providing a gas or moisture separator which can be periodically regenerated in such manner that at least the larger droplets of liquid contaminant are flushed out of the desiccant or other absorber. For use with the aforementioned desiccant or absorber or with other gas or moisture separating means, we provide a periodically regenerable liquid separator. In one arrangement the liquid separator is capable of coalescing a contaminating liquid which is then periodically removed in a unique manner. We also provide means and methods of regenerating gas and liquid separators at the same time and/or in tandem.

The liquid separator of our invention can be employed in many types of fluid systems (with or without gas or moisture separating means) wherein the flow is periodically reversed at reduced pressures or at otherwise differing flow rates. Our invention comprises a unique coalescer for microscopic mists, aerosols or larger droplets, and for periodic regeneration in a cyclically reversible fluid system. In a variation of our liquid separating means, two or more liquid separators are spaced tandemly for stagewise liquid separation but for substantially simultaneous regeneration. The latter arrangement, the normally downstream separator or separators can be provided with progressively finer coalescing media.

We accomplish these desirable results by providing a desiccant drying system for use with a compressed fluid containing desiccant contaminating liquid droplets, said system including a container structure for supporting a mass of desiccant material therein, a separator for said liquid positioned within said container structure, means for spacing said separator from said desiccant material, said separator including a coalescing member of foraminous construction and being extended entirely across the flow path of said fluid through said desiccant, and means within said container structure for periodically reverse-flowing a first portion of said fluid through said separator and for periodically reverse-flowing a second portion of said fluid through said desiccant material for regenerating said separator and said desiccant material respectively.

We also provide a similar regenerating means wherein said liquid separator includes a relatively thin coalescing member and a pair of foraminous backing members coextending with said coalescing member and sandwiching said coalescing member therebetween.

We also desirably provide a similar method wherein the liquid separator is positioned horizontally, said lower volume flow is upwardly through said liquid separator, said higher volume flow is downwardly through said separator.

We also desirably provide a similar method wherein at least two of said liquid separators are spacedly mounted in tandem in said system and along said path.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings we have shown certain presently preferred embodiments of the invention and have illustrated certain presently preferred methods of practicing the same, wherein:

FIG. 2 is a longitudinally sectioned view of another arrangement of our novel drying tower and illustrating still other methods for cleaning and regenerating certain components thereof; FIG. 2 is taken generally along reference line II–II of FIG. 3;

FIG. 6 is a partial, longitudinally sectioned view illustrating other forms of liquid separating means, and methods for cleaning the same.

Figure 3:
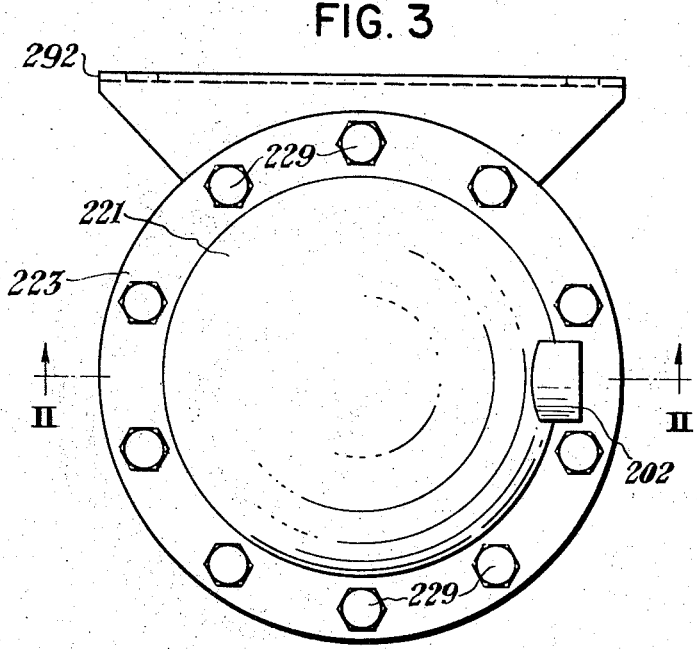
FIG. 3 is a top plan view of the apparatus shown in FIG. 2.
Figure 1:
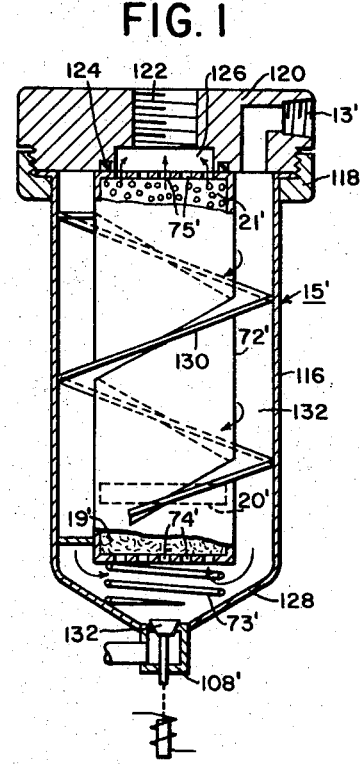
FIG. 1 is a longitudinally sectioned view of one arrangement of a drying tower in which our improved method is used to advantage.
Figure 4:
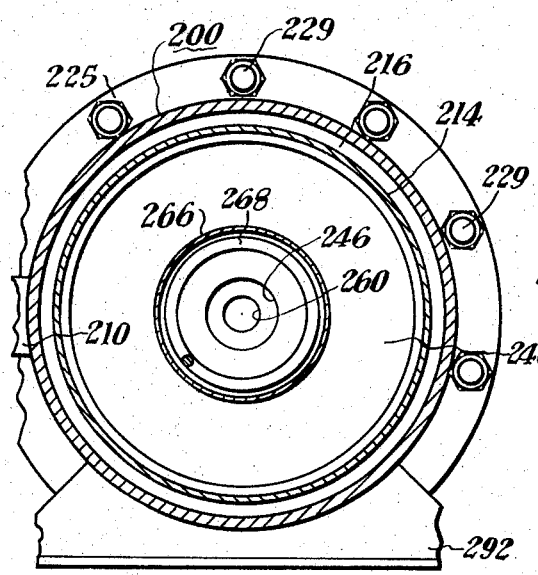
FIG. 4 is a cross-sectional view of the apparatus as shown in FIG. 2 and taken along reference line IV–IV thereof.

Referring now to FIG. 1 of the drawings, our novel drying and/or cleaning method is set forth in connection with drying tower 15. The drying tower 15 is provided with inlet, outlet and dump valve arrangements, with means also for imparting a swirl to the incoming and dumped air flowing through the tower for the purpose of removing suspended oil droplets or aerosols or other foreign matter from the system.

In the arrangement of FIG. 1, then, the desiccant tower 15 includes the generally cylindrical container 116 having a mounting flange 118 at the upper opening thereof for securance to an apertured cover 120 having a tapped outlet opening 122 therein. A sealing ring 124 is spacedly secured to the undersurface of the cover plate 120 so as to define an outlet plenum 126 therebetween. When thus secured, the sealing 124 is aligned with desiccant cartridge 72 when properly positioned within the container 116 by means of compressed spring 73 disposed at the lower, frustoconical section 128 of the container 116.

The cartridge 72 is further positioned and centered within the outer container 116 by means of a spiral vane 130 secured about the outer wall surface of the cartridge 72 and described in greater detail hereinafter. As set forth previously, the cartridge 72 can contain in the major proportion of its volume a desiccant 21 separated from a filter material 19 such as wire mesh, by means of a porous partition member 20. The filter material 19 thus is confined to the inlet end of the cartridge 72.

When thus mounted, the cartridge is spaced inwardly from the outer container 116 to define an annular plenum chamber 132, which communicates with the tapped inlet port 13.

The input air of the tower 15 thus flows generally downwardly through the annular plenum 132, but is swirled by the spiral vane 130 interposed as aforesaid between the cartridge 72, and the inner wall surface of the container 116. This swirling action throws oil particles or other suspended foreign matter in the input air against the inner wall surfaces of the outer container 116, where it runs down to the frustoconical collector section 128 at the bottom end of the container 116. The frustoconical section 128 then conducts the extracted foreign matter toward the central expeller or dump opening 132 of the container. Thus, when air is dumped from the tower at the initiation of its regeneration, the sudden outrush of air through the dump opening 132 and dump valve 108 carries with it the undesirable foreign matter which is thus collected from the inner wall surfaces by the frustoconical section 128.

In the embodiment of our invention, as illustrated in FIG. 1, whirling of the incoming fluid prevents at least part of the foreign matter contaminants, such as dust, water droplets and lubricating oil droplets from reaching the desiccant material. Foreign matter is deposited on the inner walls of the outer container by centrifugal forces developed by the whirling action. As a certain quantity of water and/or oil droplets is inevitable in any compressed fluid system, these liquids together with any entrained dust or other foreign particulate matter, coalesce on the inner wall surfaces and eventually run down to the bottom area of the container for removal by the dump valve.

Referring now more particularly to FIGS. 2 to 5 inclusive of the drawings, further embodiments of our drying and cleaning methods are set forth in connection with a desiccant container 200, the outlet 202 of which is coupled through conduit 204 and check valve 206 to the storage tank 28. The check valve 206 permits full flow through the conduit 204 from the container 200 to the storage tank 28, but does not permit any flow whatsoever in the reverse direction. Thus, there is no differential flow control means between the container 200 and the storage tank 28. Therefore, no compressed fluid can be withdrawn from the storage tank 28 to the container 200 at any time, as during the regenerative portion of the cycle for regenerating desiccant material 208 contained within the container 200. The apparatus of FIGS. 2 to 5 can be employed in conjunction with vehicular brake systems without violation of applicable codes which prohibit extracting purge or regenerative fluid from the storage tank 28.

The desiccant container 200 is provided with an inlet 210 for connection to a suitable compressor. The container 200 also is provided with a dump or exhaust valve 212 similar to that shown in FIG. 1 and for the same general purposes.

In this arrangement of the invention, the mass of desiccant material 208, which can be one of the materials mentioned previously, is contained within an inner shell or cartridge 214, which is positioned desirably coaxially within the container 200 and spaced inwardly therefrom to form an annular flow passage or plenum 216. With this arrangement, compressed air entering the container 200 through the inlet 210 flows downwardly through the plenum 216 as denoted by flow arrows 218 to the lower space 220 adjacent a rounded bottom 222 of the container 200. The lower end of the cartridge 214 rests upon the upper reaches of the rounded bottom 222 by means of a plurality of feet 224 spaced around the lower extremity of the cartridge 214, with three such feet 224 being utilized in this arrangement as better shown in FIG. 5. Between the feet 224, deeply chamfered areas 226 of the lower extremity of the cartridge 214 permit the compressed fluid to flow between the feet 224 as denoted by flow arrows 228, into the bottom plenum area 220 of the container 200. In this example, the rounded bottom 222 serves to position the lower end of the cartridge 214 substantially coaxially of the container 200 to provide the annular flow plenum 216 with a uniform radial dimension.

It will thus be seen that the cartridge or inner shell 214 is replaceable together with a desiccant material 208 and an oil separator 232 described more fully below. In furtherance of this purpose, the cartridge 214 is sealed to the upper end portion of container 200 by a unique sealing arrangement which also seals the junction between the container 200 and its top closure 221 which is removably secured to the container 200 through joining flanges 223 and 225 respectively. In furtherance of this purpose, a sealing ring 227 is inserted adjacent the inward junction of the flanges 223 and 225 where tightening of bolts 229 compresses the sealing member 227 between the adjacent extremities of the container 200, its closure 221 and the upper end portion of the cartridge 214. Thus, the sealing member 227 seals the closure 221 to the container 200 and at the same time positions the upper end portion of the cartridge 214 coaxially of the container 200, while sealing the upper plenum or purge chamber 242 of the container 200 from the annular plenum 216 between the container 200 and the inner wall or cartridge 214.

From the plenum 220 the compressed fluid flows upwardly through a number of aperture means 230 in oil separator 232, as indicated by flow arrows 231, and through lower filter pad 234 and thence through the desiccant material 208. From the desiccant material 208 the compressed fluid flows upwardly through upper filter member 236 through an intermediate plenum 238 and thence through a central aperture 246 in domed baffle 240 into an upper plenum 242. From the upper plenum 242 the compressed fluid exists from the container 200 as denoted by flow arrows 244 through outlet 202, conduit 204 and check valve 206 to the storage tank 28. As pointed out previously, once the compressed fluid is conveyed into the storage tank 28, it cannot be extracted therefrom to the conduit 204 because of check valve 206. Accordingly, no compressed fluid is returned from the storage tank 28 to the container 200 for purposes of regenerating the desiccant 208.

The compressed fluid flows through the central flow aperture 246 of baffle 240 as denoted by flow arrow 248. The flow of compressed fluid through the baffle aperture 246 is controlled by reverse bleed check valve 250, the valve-closing member 252 of which is provided with a reverse bleed aperture 254. The check valve 250 otherwise is of conventional design and in this arrangement the housing 256 thereover is threaded into container 258, the lower end of which is apertured at 260 and otherwise further constricts the flow opening 246 of the domed baffle 240. The check valve receptacle 258 in this example is secured to the top surface of the baffle 240 as by welding, as viewed in FIG. 2.

In this arrangement, the flow baffle 240 desirably is domed inasmuch as a relatively high pressure differential can exist thereacross when the exhaust valve 212 is opened during the regenerative portions of the operating cycle. Thus, the intermediate plenum 238 at such times, together with the desiccant chamber 208, is exhausted within a very short time. The rapid flow of decompressed fluid from the intermediate plenum 238 flushes dirt and other foreign matter from the desiccant 208 and also from the separator 232. The intermediate plenum fluid also aids in regenerating the separator 232 in the manner described below.

On the other hand, the upper plenum 242 which serves as an integral purge chamber for the desiccant material 208, is exhausted at a much slower rate owing the the differential flow control feature of the reverse bleed check valve 250. Therefore, within a very short time after opening the exhaust valve 212 substantially the entire compressor outlet pressure will exist across the domed baffle 240.

The volume of dry compressed fluid normally contained within the upper plenum 242 at the end of the compression cycle is sufficient, after bleeding slowly through aperture 254 of the reverse metering check valve 250 and expanded to substantially atmospheric pressure within the desiccant chamber 208 by exhaust valve 212, to completely regenerate the absorbent material or desiccant 208.

The upper filter member 236 in this example is slidably mounted within the upper end portion of the cartridge 214 and adjacent the domed flow baffle 240. In a desirable form of the upper filter member 236, a porous filtering pad 262 such as open-celled polyurethane foam is likewise stretched over an apertured, relatively rigid backing member 264, having a somewhat smaller diameter than the inner diameter of the cartridge shell 214. The filter pad 262 is partially wrapped about the periphery of the backup plate 264 so that the filter member 236 is closely and slidably fitted within the shell 214. The backup plate 264 can be constructed from perforated sheet steel or other suitably foraminous structural material.

Desirably, the central region of the backup plate 264 is not apertured where it engages retaining cup 266 for suitable biasing means such as spring 268. The biasing means 268 urges the slidably mounted upper filter pad 236 downwardly against the desiccant material 208 to apply compression thereto. This compressive action minimizes vibration and attrition of individual desiccant particles that may be provided within the desiccant chamber.

The lower filter pad 234 is similarly constructed with the exception that the lower backup plate 270 can be uniformly perforated as shown and is provided with a depending lip 272 whereby the backup plate and the filter material 274 stretched thereover is positioned in the cartridge shell 214 with rivets 276 or other suitable fastening means.

Spring-retaining cup 266 can be omitted if desired whereupon the lower end of the spring 268 can engage directly the upper surface of the upper backup plate 264. Use of the spring retaining cup 266, however, serves as a catch basin for any particles of foreign matter which may issue through the reverse bleed check valve 250 during desiccant regeneration when purge flow fluid flows from the purge chamber 242 through the intermediate plenum 238 and thence through the desiccant chamber 208 as denoted by reverse flow arrows 278.

The cup 266 as shown in FIG. 2 is mounted directly beneath the central flow aperture 246 of the domed baffle 240. The reversed regenerating flow from the purge chamber 242 through the check valve aperture 254 is caused to disperse radially by the presence of the cup 266 so that a portion of the reverse flow is diverted toward the outer periphery of the perforated backup plate 264. As a result, the entire mass of the material in the desiccant chamber 208 is exposed to the reverse, regenerative flow from the purging chamber 242.

The oil separator 232, as arranged in accordance with our invention, includes exemplarily a pair of foraminous or, as shown, backup members 280 and 282 with a relatively thin disc of foraminous or porous material, such as filter paper 284 sandwiched therebetween. The term foraminous as used herein and in the appended claims in inclusive of apertures of uniform or nonuniform sizes, and of porosity such as encountered in the aforementioned filter paper or in finely or coarsely sintered members, and of reasonable equivalents.

Thus, it is contemplated that a relatively thin, finely sintered filtering member 284 can be sandwiched between relatively thick, coarsely sintered backing members 280 and 282 to provide the necessary structural rigidity of the separator 232. Alternatively, a single, relatively thicker but finely sintered filtering member (not shown) or other finely porous filtering member having requisite structural strength to withstand the anticipated pressure drops thereacross, can be employed without one or both of the backing members 280, 282 as described more fully below.

The backup members 280, 282 and the filter paper 284 are secured together by a clamp or channeled peripheral retaining member 286 which is shrunk or force-fitted into the lower end portion of the cartridge 214 to securely position the oil separator 282 at a location spaced from the lower filter pad 234. As better shown in FIGS. 2 and 5, each of the backup plates 280, 282 are provided with a relatively large number of apertures, with the respective apertures thereof being desirably in substantial alignment. The imperforate areas of the backup plates 280, 282 thus provide structural rigidity to the filter paper 284, which would otherwise rupture if substantially larger continuous areas thereof were presented to the incoming compressed fluid (flow arrows 231) and to the explosive discharge of the fluid in cartridge 214 during the initial stage of reactivation. The apertures 230 of the upper backup member 280 of the oil separator 232 also serve to collect the oil which coalesces on the upper surface of the filter paper 284.

A space 286 between the lower filter pad and the oil separator 232 prevents contact of the upper pad 234 and the desiccant material 208 by the coalesced oil, whose capilarity and wettability otherwise would permit a relatively rapid transfer of the coalesced oil from the separator 232 to the lower filter pad 234.

In the arrangement shown, the filter paper 284 is a resin impregnated filter paper of commercial availability such as Liquid Separator Paper, Run 0106024 (0.030 inch thick), made by Riegel Paper Corp., Paper Division, 260 Madison Avenue, New York, N.Y. 10016. However ordinary filter paper, thin porous metal sheet or sintered metal, porous plastic material or porous glass can be substituted.

It is contemplated that the filtering member 284 and the backup members 280 and 282, if used, need not be flat but can take any desired and convenient shape such as conical or cup-shaped, as long as the separator 232 extends entirely across the path of the incoming compressed fluid and of the outgoing exhaust or purge fluid.

Where a somewhat more rigid filter member, such as a sintered member, is used in place of the filter paper 284, the normally downstream backup member 280 can be omitted where the pressure differentials usually associated with normal, forward flow of compressed fluid (flow arrows 231) are not severe. Where a sintered structural material such as sintered bronze, stainless steel or carbon is employed for the filter member comprising the separator 232, both backup members can be omitted.

Bypassing of the filter member or disc 284 is prevented by a tightly fitted engagement between the channel retaining ring 288 and the adjacent inner wall portion of the cartridge 214.

Figure 5:
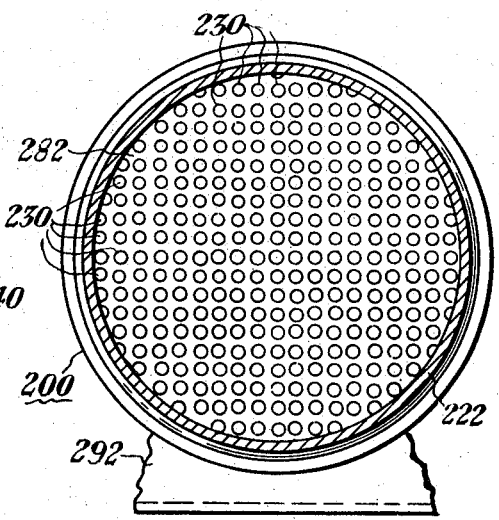
FIG. 5 is another cross-sectional view of the apparatus as shown in FIG. 2 and taken along reference line V–V thereof.

Since in most compressed fluid systems the contaminating oil exists in the system as a mist of microscopic dimensions, a surface-type filter with minute pore size, such as that shown at 284 in FIGS. 2 and 5, is required to coalesce the oil mist. The use of a surface-type filter permits the oil separator 232 to be periodically regenerated by high volume flow reversals, in contrast to the use of a depth-type filter.

In order to ensure complete purging and regeneration of the oil separator 232, the latter in this example is supported in a horizontal position so that the coalesced oil is largely confined to the apertures 230 of the upper backup plate 280 at relatively low forward flow rates. At higher forward rates the uprush of air or other incoming fluid through the aperture 230 tends to force the coalesced oil out of the apertures and onto the intervening solid portions of the upper plate 280. At high volumetric reverse flows the coalesced oil is wiped off these upper plate surfaces and carried back through the apertures 230 and filter disc 234 as described below. In no case, however, does any significant quantity of coalesced oil migrate downstream to the desiccant 208.

It is contemplated in appropriate applications and in modified structures, that the oil separator 232 can be mounted in other than a horizontal position, or that the normal flow of compressed fluid can be reversed so that coalesced oil collects on the underside of the separator 232 and the reverse regenerating flow purges the coalesced oil upwardly through the separator instead of downwardly. In any event, the surface tension of the coalesced oil is sufficient, under most operating conditions, to maintain the coalesced oil on the normally downstream side of the separator without dripping. Where a perforated or other foraminous backing member is employed on the normally downstream side of the separator, the edges of the perforations and the intervening surfaces of the backing member offer additional oil-collecting surfaces irrespective of the position of the separator.

When the exhaust valve 212 is periodically opened, the almost explosive outrush of compressed fluid from the intermediate plenum 238, the desiccant chamber 208, and the space 286 between the lower filter pad 234 and the oil separator 232 forces the coalesced oil on the normally downstream sideback through the filter disc 234 and through the apertures 230 of the lower or normally upstream plate 282, and out of the container 200 as denoted by flow arrows 290. In the case of a compressor in proper operative condition, the volume of coalesced oil is seldom sufficient to enter the apertures of the upper backup member 280 so that the coalesced oil stands upon the upper surface of the normally downstream backup member 280, which is wetted by the coalesced oil, but there is little or no possibility of wetting the adjacent inner wall portion of the inner shell 214. However, with poorly maintained compressors which pass excessive quantities of lubricant, the entire upper or normally downstream surface of the oil separator 232 can be completely covered with coalesced oil without preventing coalescence of additional fine oil droplets (aerosols), and the separator can still be properly regenerated by the high volume reverse purge flow. Thus, the separating space 286 prevents the coalesced oil from traveling with the incoming fluid stream to the desiccant material, and the coalesced oil is substantially completely removed from the oil separator during the initial portion of each regenerative interval.

When the aforementioned compressor has restarted or when incoming compressed fluid is otherwise admitted to the container 200, the oil separator is again immediately available for removing oil contaminants.

During the remainder of each regenerative interval and after the initial outrush of compressed fluid from the chambers 238, 208 and 286, regenerative fluid, exiting through the reverse bleed aperture 254 of the check valve 256 continues to flow through the desiccant chamber 208 until the desiccant material is regenerated, at which time the compressing interval of the operating cycle is reinstated.

The oil separator 232 and desiccant 208, then, essentially are regenerated in sequence. The momentary pressure drop which occurs across the oil separator 232 when the dump valve 212 is opened quickly regenerates the oil separator 232, whereupon the relatively slower regeneration of the desiccant material 208 commences. At this time regenerative fluid is conveyed from the upper plenum 242 through the differential fluid control means, including the reverse bleed check valve 250, and through the desiccant material as denoted by flow arrows 278. This flow is substantially at the discharge pressure of the dump valve 212.

It will be seen that the desiccant, the oil separator means 238, the oil separator-regenerating means including chambers 208, 238, 286 and the desiccant regenerating means including the upper plenum 242 and the desiccant purge means or chamber 238 are all contained within a single container 200 so that the number of external plumbing connections within the system are minimized. The components of the compressing and drying apparatus which are thus contained within the container 200 can be quickly and easily installed or removed as a single unit of the system. The use of the sealing ring 227 in addition to its functions described previously also reduces the amount of vibrational or other shock forces transmitted to the cartridge 214 from the outer container 200.

If desired, a number of brackets 292 can be secured to the outer wall surface of a container 200 for mounting purposes.

Referring now to FIG. 6 of the drawings, another arrangement of the oil-separating means is illustrated therein. It will be understood, of course, that the oil-separating means according to either FIG. 2 or 6 can be utilized in other apparatus than that shown, as long as the system in which the oil separating means are utilized is subjected to periodic flow reversals of the character which will purge the coalesced oil in the manner described.

In the modification of FIG. 6, a pair of oil separators 294 and 296 are spacedly mounted adjacent the lower end of cartridge 214. The oil separators 294, 296 are spaced from one another and from the lower filter pad (not shown in FIG. 6) or other system component with the result that the spaces 286 and 298 prevent oil communication respectively therebetween. The normally upstream oil separator 294 is generally similar to the upper separator 296 and both are constructed substantially in the manner described above in connection with the oil separator 232 in connection with FIGS. 2 and 5. Desirably, the filter disc 300 of the normally downstream separator 296 is provided with a smaller pore size than the lower filter disc 302. With this arrangement, the proportion of removed oil is progressively increased, although it will be understood that the filter discs 300, 302 can be identical depending upon the application of the invention. If desired, additional oil separating means (not shown) can be mounted in a similar manner in series with the oil separators 294, 296 and spaced therefrom and from an adjacent system component (not shown) as set forth in connection with the lower filter pad 234 of FIG. 2.

During each flow reversal, the coalesced liquid on the normally downstream side of the downstream separator 296 is driven back through both separators 294, 296 and out of the system. The fluid portion in the space 298 between the separators at least aids in driving the coalesced liquid on the downstream side of the upstream separator 294 back through the separator 294.

From the foregoing it will be apparent that novel and efficient means and methods have been disclosed herein for separating fluids in compressed fluid systems. Although our novel methods have been described primarily for use with compressed air systems, it will be apparent that our arrangement is readily adaptable for use with other compressed gases or fluids Similarly, as pointed out in the opening paragraphs, our system is not limited to the removal of water vapor and oil from such systems but is much more broadly based. While we have shown and described certain presently preferred embodiments of the invention and have illustrated certain presently preferred methods of practicing the same, it is to be distinctly understood that the invention is not limited thereto and may be otherwise variously embodied and practiced within the scope of the following claims.

We claim:

1. A method for periodically regenerating a relatively thin foraminous liquid separator for a liquid contaminant, said method comprising the steps of defining a path for flow of fluid containing said contaminant, extending said separator completely across said path so that all of said fluid flows through said separator, shaping said separator such that substantially all of the liquid contaminant collected thereby coalesces on the normally downstream outer surface of said separator, flowing said fluid and liquid contaminant in a normal flow direction along said path until a significant quantity of said liquid contaminant coalesces on said separator, segregating a portion of said fluid downstream of said separator relative to said normal flow, periodically flowing said segregated portion in a reverse direction through said separator at a substantially faster rate to drive said coalesced liquid back through said separator, and conducting said segregated portion flow and the coalesced liquid contained therein away from said fluid path.

2. The method according the claim 1 and comprising the additional step of reverse-flowing said fluid portion to a region of substantially lower fluid pressure.

3. A method for periodically regenerating desiccant material and a desiccant contaminating liquid separator, said method comprising the steps of defining a fluid path, placing said desiccant material and said liquid separator at spaced locations along said path so as to extend completely across said path, flowing a moisture and contaminating liquid-containing fluid in a normal flow direction along said path and through said separator and said desiccant material in that order, segregating first and second portions of said fluid normally downstream of said desiccant and said separator, periodically flowing said first fluid portion in a reverse direction along said path and through said desiccant material to regenerate the same, and periodically flowing said second fluid portion in a reverse direction along said path through said separator to regenerate the same.

4. A method for periodically regenerating desiccant material, said method comprising the steps of defining a fluid path, placing said desiccant material in said path, flowing a moisture and contaminating liquid containing fluid in a normal flow direction through said path and through said desiccant material, segregating first and second portions of said fluid adjacent said desiccant on a normal downstream side thereof, periodically flowing said first fluid portion in a reverse direction along said path and through said desiccant material at a faster rate for desiccant flushing purposes, periodically flowing said second fluid portion in a reverse direction along said path at a slower flow rate through said desiccant material to regenerate the same, and directing each of said fluid portions radially of the adjacent surface of said desiccant material and thence through said desiccant material.

5. The method according to claim 3 and comprising the additional steps of segregating a third portion of said fluid adjacent said desiccant material, and periodically flowing said third fluid portion in a reverse direction along said path and through said desiccant material and said liquid separator to flush foreign material from said desiccant material and to aid in regenerating said separator.

6. The method according to claim 3 and comprising the additional step of reverse-flowing said second portion at a substantially faster rate.

7. The method according the claim 6 and comprising the additional steps of reverse-flowing said first and said second fluid portions respectively to regions of substantially reduced fluid pressures.

8. The method according the claim 3 and comprising the additional step of segregating said first portion adjacent said desiccant and said second portion adjacent said separator.

9. The method according to claim 1 wherein at least two relatively thin foraminous liquid separators are spacedly mounted along said path and said method comprises the modified step of reverse-flowing said portion in tandem through said separators so that surface coalesced liquid on the normally upstream separator is driven back through said upstream separator and that the surface coalesced liquid on the normally downstream separator is driven through both of said separators.

10. The method according to claim 9 and comprising the additional steps of segregating a second fluid portion in a space between said separators, and periodically reverse-flowing said second portion through said upstream separator to aid at least partially in regenerating the same.

11. A desiccant drying system for use with a compressed fluid containing desiccant contaminating liquid droplets, said system including a container structure for supporting a mass of desiccant material therein, a separator for said liquid positioned within said container structure, means for spacing said separator in a normally upstream direction from said desiccant material, said separator including a coalescing member of thin foraminous construction and being extended entirely across the flow path of said fluid through said desiccant, said member being shaped to retain substantially all of the coalesced liquid on the normally downstream surface thereof, and means coupled to said container structure for periodically reverse-flowing a first portion of said fluid through said separator and for periodically reverse-flowing a second portion of said fluid through said desiccant material for regenerating said separator and said desiccant material respectively.

12. The combination according to claim 11 wherein said liquid separator includes a relatively thin coalescing member and a pair of foraminous backing members coextending with said coalescing member and sandwiching said coalescing member therebetween.

13. The combination according to claim 12 wherein the liquid separator is positioned horizontally, said lower volume flow is upwardly through said liquid separator, said higher volume flow is downwardly through said separator.

14. The combination according to claim 11 wherein at least two of said liquid separators are spacedly mounted in tandem in said system and along said path.